(12) United States Patent
Van Rensburg et al.

(10) Patent No.: US 11,835,537 B2
(45) Date of Patent: Dec. 5, 2023

(54) FLUID EJECTOR SYSTEM

(71) Applicant: TTP Plc, Royston (GB)

(72) Inventors: Richard Janse Van Rensburg, Royston (GB); Benjamin James Metcalf, Royston (GB)

(73) Assignee: TTP Plc, Royston (GB)

( * ) Notice: Subject to any disclaimer, the term of this patent is extended or adjusted under 35 U.S.C. 154(b) by 48 days.

(21) Appl. No.: 16/756,883

(22) PCT Filed: Oct. 18, 2018

(86) PCT No.: PCT/GB2018/053009
§ 371 (c)(1),
(2) Date: Apr. 17, 2020

(87) PCT Pub. No.: WO2019/077355
PCT Pub. Date: Apr. 25, 2019

(65) Prior Publication Data
US 2021/0025913 A1    Jan. 28, 2021

(30) Foreign Application Priority Data
Oct. 18, 2017    (GB) ...................................... 1717103

(51) Int. Cl.
*G01N 35/10* (2006.01)

(52) U.S. Cl.
CPC ..... *G01N 35/1095* (2013.01); *G01N 35/1009* (2013.01)

(58) Field of Classification Search
None
See application file for complete search history.

(56) References Cited

U.S. PATENT DOCUMENTS

| 6,960,437 B2 | 11/2005 | Enzelberger et al. |
| 2005/0087122 A1* | 4/2005 | Ismagliov ............. G01N 35/08 117/2 |

(Continued)

FOREIGN PATENT DOCUMENTS

| EP | 1371411 A1 | 12/2003 |
| WO | 2005100030 A1 | 10/2005 |

(Continued)

OTHER PUBLICATIONS

PCT Patent Application PCT/GB2018/053009 International Search Report and Written Opinion dated Dec. 3, 2018.

(Continued)

*Primary Examiner* — P. Kathryn Wright
(74) *Attorney, Agent, or Firm* — Erise IP, P.A.

(57) ABSTRACT

There is provided a sample ejection system for ejecting a sample from a flow of fluid, the system comprises: a fluid flow channel for receiving, in use, the flow of fluid; a fluid inlet channel connected to the flow channel and arranged to receive, in use, pressurised fluid; a fluid outlet channel connected to the flow channel at a location downstream in the flow direction of the flow of fluid and comprises an outlet. The system is arranged such that, in use, pressurised fluid is applied to the fluid flow channel via the fluid inlet channel to drive fluid from the region of the fluid flow channel between the fluid inlet and outlet channels through the fluid outlet channel and out of the outlet.

16 Claims, 11 Drawing Sheets

Stand-by state

(56) References Cited

U.S. PATENT DOCUMENTS

| | | | |
|---|---|---|---|
| 2007/0039866 A1 | 2/2007 | Schroeder et al. | |
| 2008/0003142 A1* | 1/2008 | Link | B01L 3/565 |
| | | | 422/82.08 |
| 2008/0129798 A1 | 6/2008 | Wee et al. | |
| 2012/0040472 A1* | 2/2012 | Churski | B01F 5/0646 |
| | | | 436/180 |
| 2013/0257994 A1 | 10/2013 | Panchawagh et al. | |
| 2020/0215546 A1* | 7/2020 | Josephides | B01L 3/502761 |
| 2021/0308682 A1* | 10/2021 | Craig | G01N 15/1484 |

FOREIGN PATENT DOCUMENTS

| | | | |
|---|---|---|---|
| WO | 2016187106 A1 | 11/2016 | |
| WO | WO-2016193758 A1 * | 12/2016 | B01L 3/50273 |
| WO | WO-2018234821 A2 * | 12/2018 | B01D 17/02 |
| WO | WO-2018234821 A3 * | 2/2019 | B01D 17/02 |

OTHER PUBLICATIONS

Search Report dated Apr. 16, 2018, in Application No. GB1717103.4.

* cited by examiner

Channels A, C and D form the Main Channel.
Figure 1
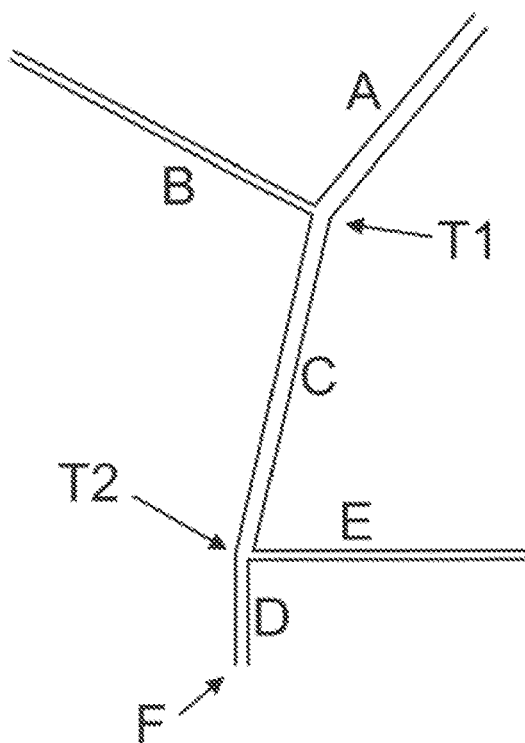
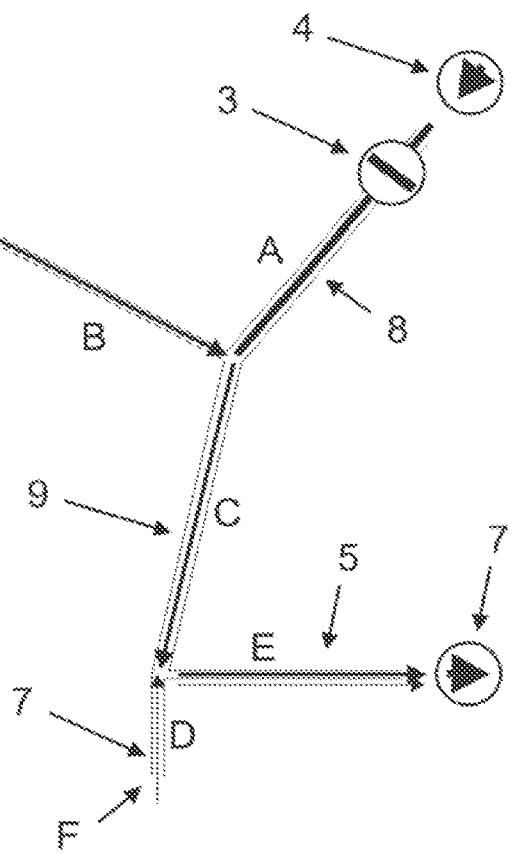
Figure 2
Stand- by state Ejection State Suction Channel Restriction Figure: Ejection Flow as a function of Suction ChanneLength (at a fixed value of the Suction Vacuum level)

Figure: Fixed suction pressure, variable Suction Channel length

Process Fluid Restriction

Process Fluid Inlet Restriction in the form of a lengthened flow path

Using active Valves in the Feed and Suction Channels

Tapered Nozzles with and without inserts

Removable insert

US 11,835,537 B2

FLUID EJECTOR SYSTEM

RELATED APPLICATIONS

The present application is a national stage application under 35 U.S.C. § 371 of International Application No. PCT/GB2018/053009, filed 18 Oct. 2018, which claims priority to European Patent Application No. 1717103.4, filed 18 Oct. 2017. The above referenced applications are hereby incorporated by reference into the present application in their entirety.

BACKGROUND

The present invention relates to a fluid ejector system for selecting a sample from a continuously flowing fluid stream for ejection into an external receptacle. Such fluid ejector systems can be employed for dispensing one or more droplets of a fluid or one or more items, such as cells in a bioprocessing system, in a flow of fluid.

There are many fluid processing systems for which there is a need to obtain a sample of a fluid that is in continuous flow within the system. Such fluid processing systems include biological and chemical processing systems, analysing systems and printing systems. Many such systems operate with small volumes of fluid in the continuous flow and require very small amounts of samples to be taken. It is often important that the continuous flow process is not significantly affected by the sample taken. Such systems also often require that fluid in continuous flow is not contaminated during the sample process, that the sample be taken in an automated fashion when required, and that a very precise sample volume can be obtained.

SUMMARY

The present invention seeks to meet these requirements.

According to the present invention there is provided a sample ejection system for ejecting a sample from a flow of fluid, the system comprising: a fluid flow channel for receiving, in use, the flow of fluid; a fluid inlet channel connected to the flow channel and arranged to receive, in use, pressurised fluid; and a fluid outlet channel connected to the flow channel at a location downstream in the flow direction of the flow of fluid and comprising an outlet; the system arranged such that, in use, pressurised fluid is applied to the fluid flow channel via the fluid inlet channel to drive fluid from the region of the fluid flow channel between the fluid inlet and outlet channels through the fluid outlet channel and out of the outlet.

With the configuration of the present invention it is possible to deliver pressurized fluid to the inlet to drive a sample of predetermined volume through to the outlet with only a minor effect to the flow of fluid through the system.

The system can be automated simply to control the delivery of fluid to the outlet and can be arranged to operate almost instantaneously when required. Furthermore, no manual handling of the sample that is obtained is necessary and the fluid that is provided to the inlet to obtain the sample can easily be selected so that it does not affect the process being performed.

The system of the present invention can be arranged to be employed in a wide variety of processes, from a printing process with a continuous feed, through to microfluidic chemical and biochemical analysis systems where the amount of fluid being passed through the system in continuous flow can be very small. Furthermore, the system can be adapted to have a detector in the continuous flow at a position upstream, the detector being arranged to determine the present of a desired component and to provide a trigger signal to deliver pressure through the inlet of the system to provide a sample of the desired component in a simple and automated fashion.

BRIEF DESCRIPTION OF THE DRAWINGS

The examples of the present invention will now be described with reference to the accompanying drawings in which:

FIG. 1 is a schematic view of the channels in a system according to the present invention;

FIG. 2 is a schematic view of a first operating state of the system of the present invention;

DETAILED DESCRIPTION

Referring to FIG. 1, a system according to the invention comprises a device which comprises a set of flow paths linked together to provide a main fluid path with two side channels connected to it, in this example, through T-junctions. One end of the main fluid path provides an inlet for pressurized fluid, while the other end terminates in an outlet that serves as an orifice through which fluid can be ejected to the exterior. The component channels need not be rectilinear or co-planar, and can all have different lengths and cross-sectional geometries, as will be discussed in more detail below. The junctions need not be "T" junctions but may have other configurations such as a "Y" junction.

Referring to FIG. 1, the device has five component channels: an inlet channel A for the entry of pressurized fluid, controlled by an external valve situated at the entrance to channel A; an inlet channel B for the entry of process fluid that meets inlet channel A at a junction T1; a central channel C connected to T1 that drains the output from T1 and is connected to a junction T2; an exit channel D from Junction T2 leading to an exit orifice F from which fluid is ejected to the exterior; and a suction channel E connected to channels C and D at junction T2 and attached to an external vacuum system to extract fluid from junction T2. The channels A, B and C form a main channel.

Figure 3:
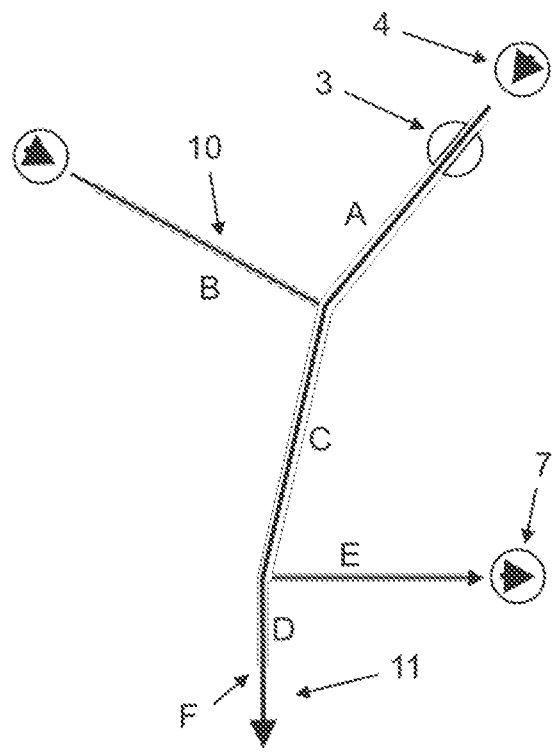
FIG. 3 is a schematic view of a second operating state of the system of the invention.

In normal operation, the device has two states. The first is shown in FIG. 2 and is a stand-by state in which flow into channel A is shut off by a control valve and in which process fluid flows continuously through the device via channels B, C and E. The second is shown in FIG. 3 and is an active state in which the control valve at A is open and fluid flows through channels A, C and D and is ejected to the exterior through orifice F.

In the stand-by state process fluid 1 provided at a fixed flow rate by the external system 2 flows in through B. The external valve 3 is shut off and channel A is filled with fluid 8 which is prevented from flowing by the valve 3. All of the process fluid 8 thus flows through channel C. The vacuum level at E, provided by the external system 7, is so adjusted that the flow through E is sufficient to clear the process fluid entering through B and also to ensure that a small amount of air 7 is drawn in through the orifice F. Thus the fluid removed by the suction system 5 is a mixture of process fluid and a small amount of air.

In the ejection state, the valve 3 is opened allowing pressurised fluid provided by the external system 4 to force fluid to flow in through channel A, along channels C and D and emerge as a stream or droplets 11 from orifice F.

In normal operation, the valve 3 is expected to open rapidly, for example as quickly as 1 millisec, and remain open for times as short as 10 millisecs in order to eject only small amounts of fluid. This timing is dependent on the flow rate through channel A and the length of channel C if it is desired to ensure that the entire content of channel C is ejected.

It will be appreciated that selection of the channel structure, length, diameters, and relative proportions with respect to one another can alter the flow characteristics and affect operation of the system. This has advantages in terms of making the system capable of operating in a large number of different processes.

Figure 4:
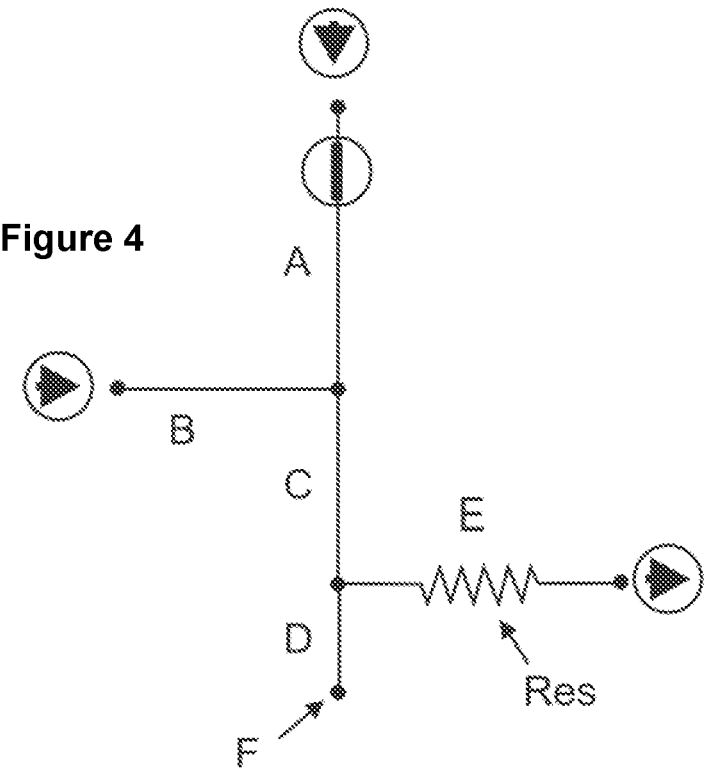
FIG. 4 is a fluid circuit diagram of one example of the system of the present invention.
Figure 5:
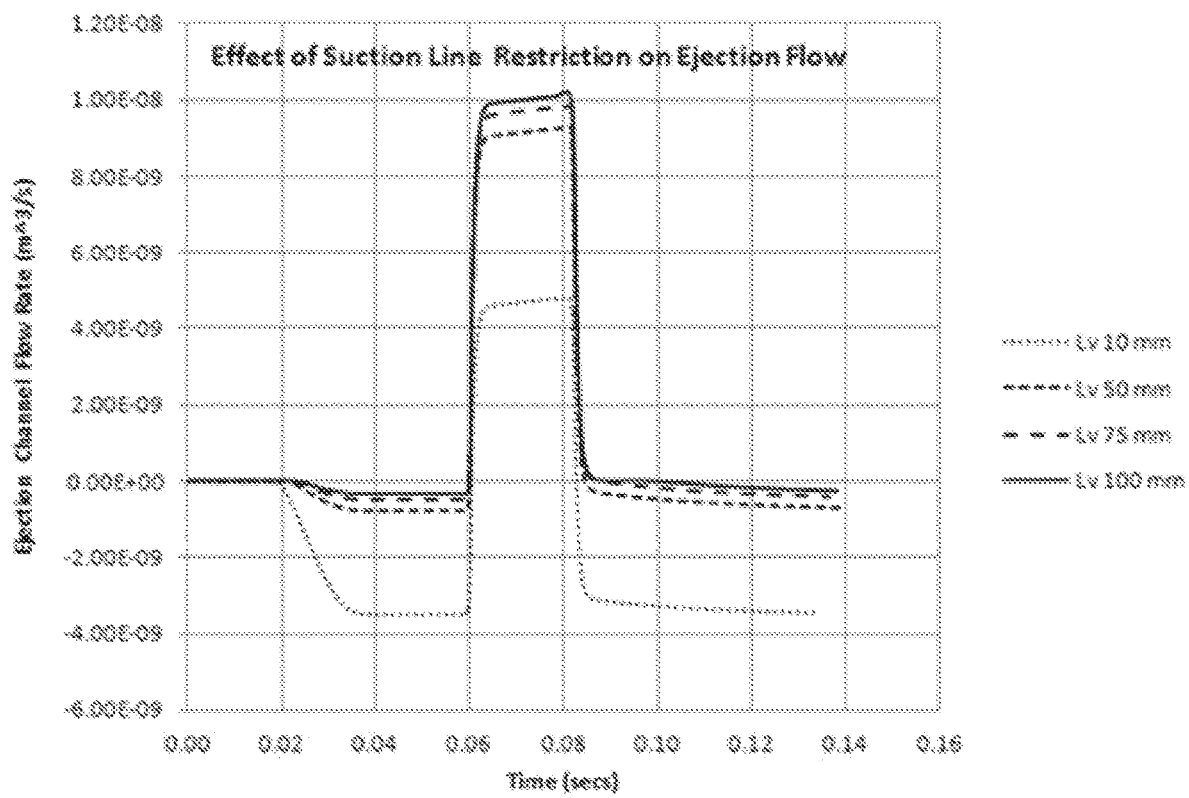
FIGS. 5 and 6 are graphs showing physical parameters of an example of the present invention varying structural dimensions.
Figure 6:
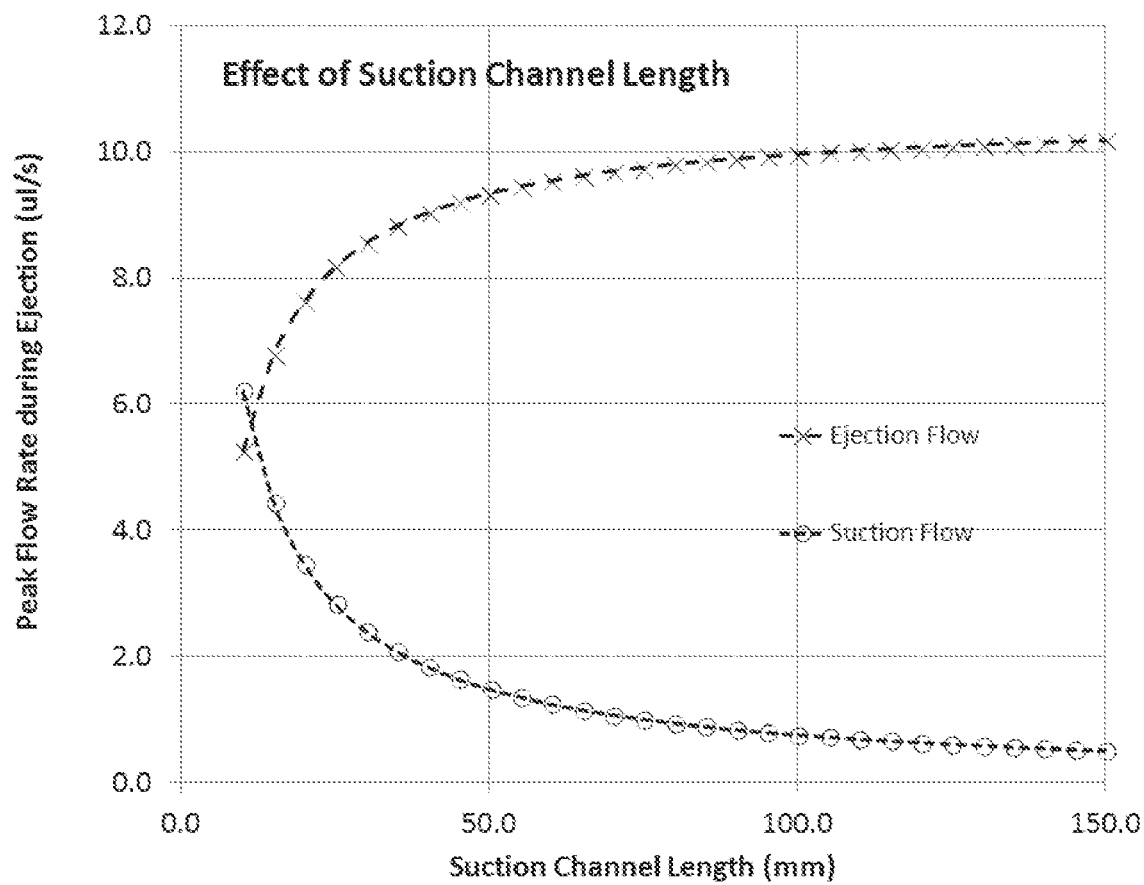

During the ejection state the increased pressure in the main channel potentially causes fluid to flow down the suction channel and so reduce the ejection pressure in the main channel. This can be mitigated by using an active valve in the suction channel or by restricting the flow down the channel either by increasing its length or by introducing a flow restriction, which could simply be a narrowing of part or all of the channel cross-section, this is represented in FIG. 4. The effects of provision of a restriction in the suction line are shown in FIG. 5. FIG. 6 shows the relationship between suction channel length and ejection and suction flow for a fixed suction pressure.

Figure 7:
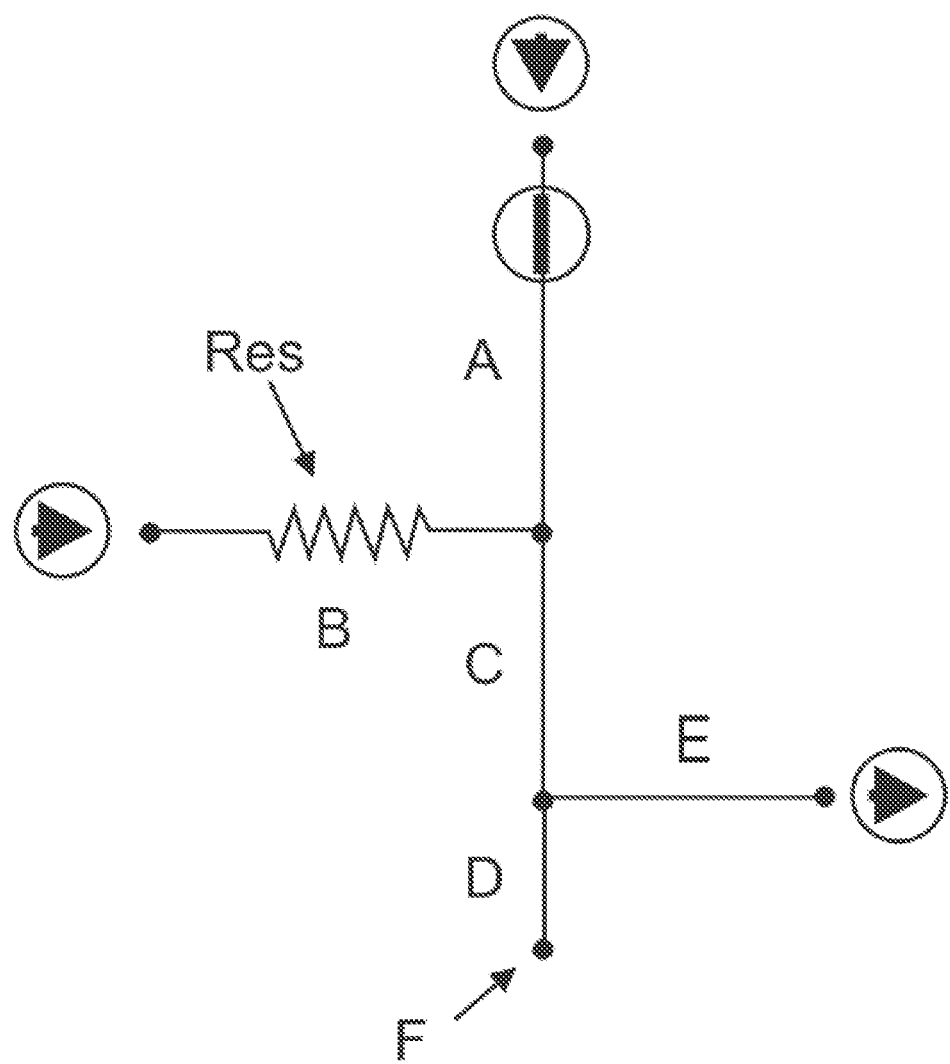
FIG. 7 is fluid circuit diagram of a further example system according to the invention.
Figure 8:
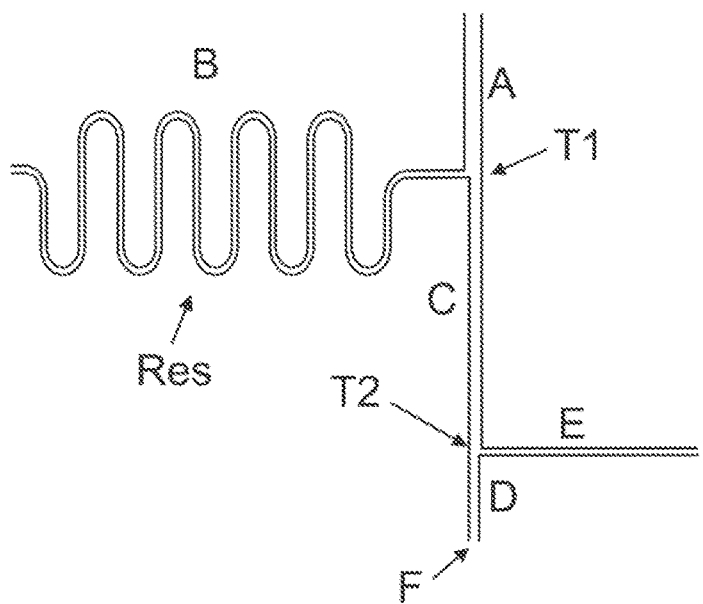
FIG. 8 is a schematic diagram showing a further alternative channel structure from an example of the present invention.
Figure 9:
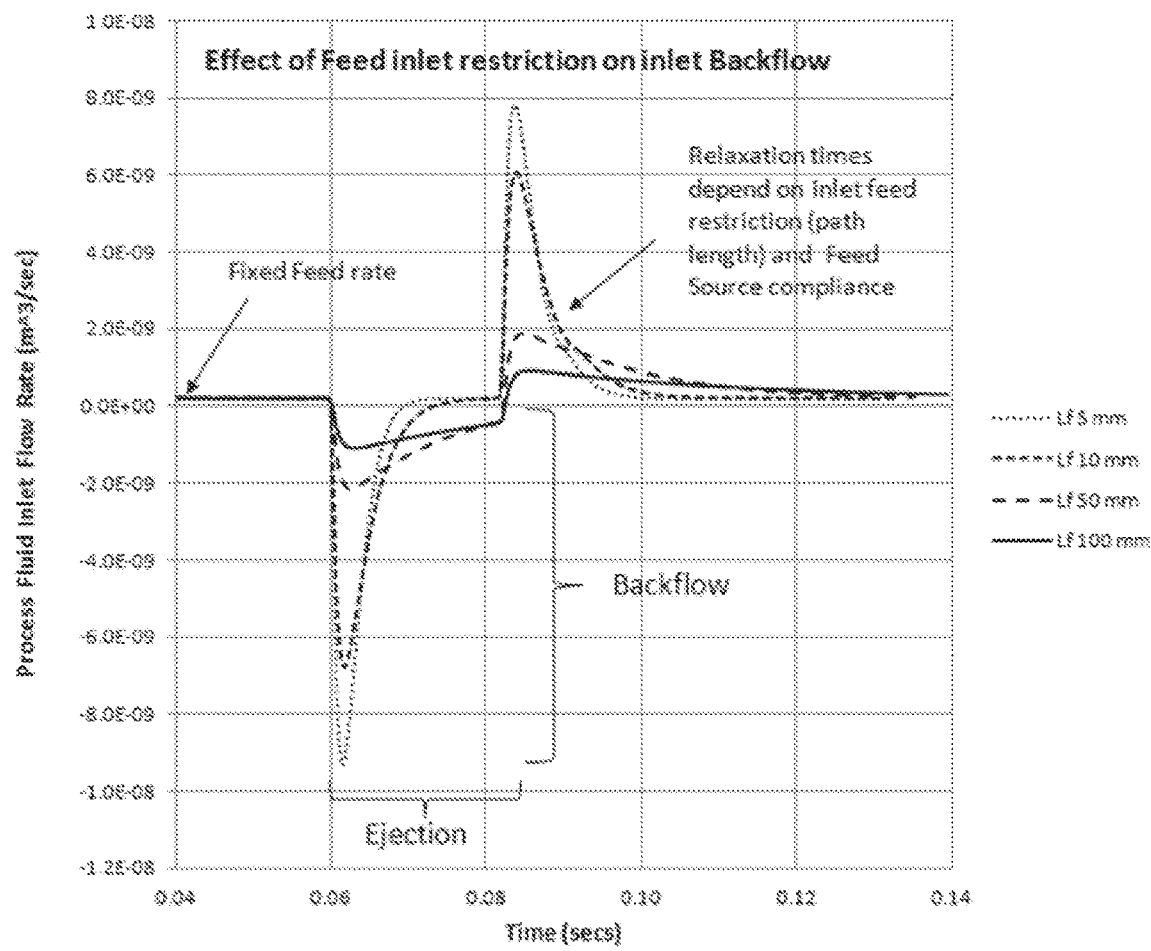
FIG. 9 is a graph showing the effect of various physical parameters of the example of FIG. 8.

During ejection, the sharp increase of pressure at junction T1 reacts back on the process fluid supply in the external microcircuit. If the supply or the connecting tubing has any compliance, the pressure will cause the fluid to flow back up the channel towards the supply. The pressure at T1 will fall and the ejection flow will be affected, both in peak magnitude and in exhibiting a response timescale. FIGS. 7 and 8 show how a restriction can be placed in the process fluid inlet channel to counter this effect. In Figure B the restriction is in the form of a lengthened flow path. FIG. 9 shows the effect of such a restriction on backflow in the process fluid inlet As an alternative, or in addition to, the employment of restrictions in the process fluid inlet channel and/or suction channel, active valves 10, 21 and may be provided as shown in FIG. 10.

Figure 10:
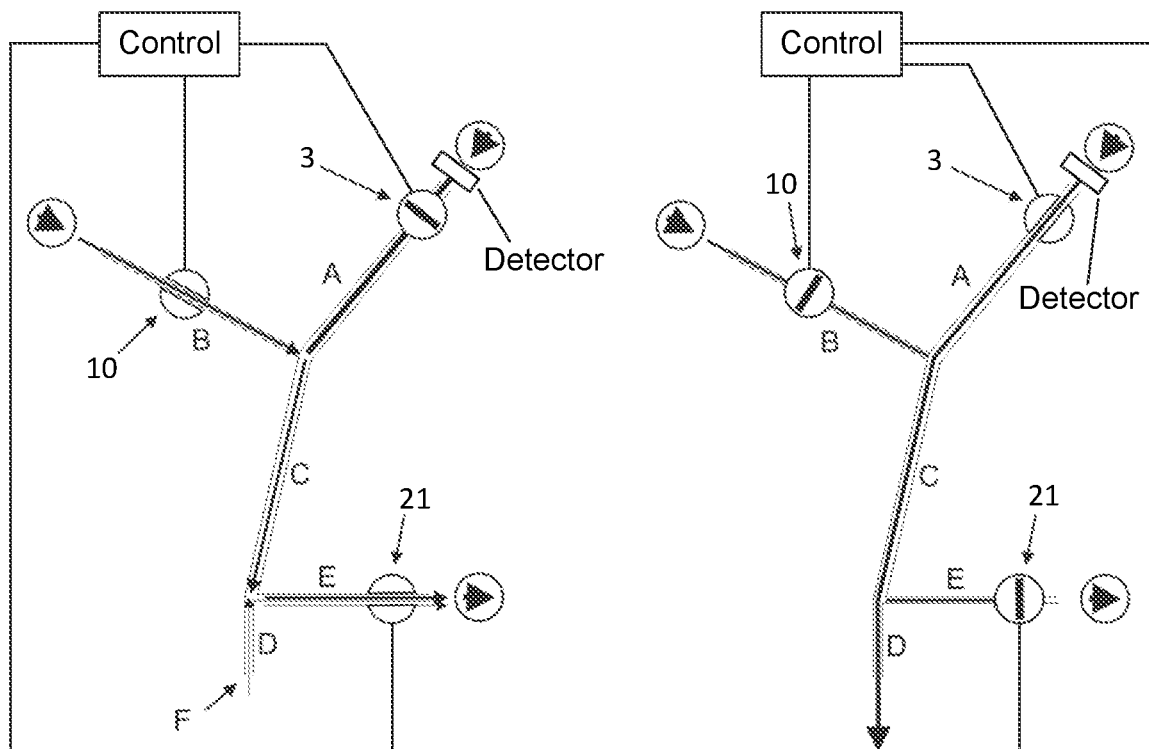
FIG. 10 is a schematic diagram showing an example of the system of the invention employing active valves.

As can be seen from FIG. 10 during normal operation of the continuous flow process active valve 10 and active valve 21 are open to allow flow through channels B, C and E in turn as the process continues. When ejection is required pressurized fluid is applied by opening valve 3 with, the same instant, valves 10 and 21 being closed to allow the contents of channel C to be ejected via outlet D.

Figure 11:
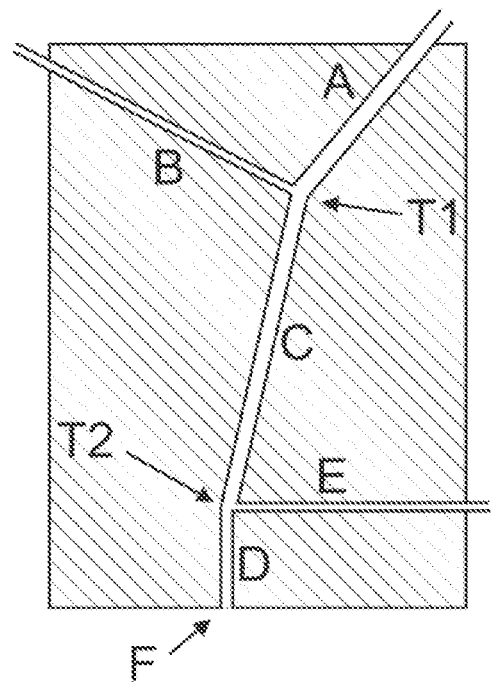
FIG. 11 is a side view of a further system of the invention in schematic form.
Figure 12A:
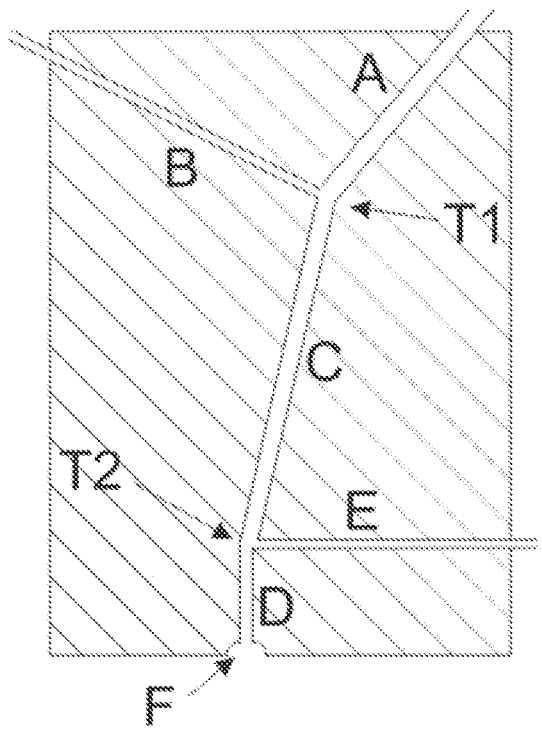
FIGS. 12A and 12B show a system of the present invention with an alternative nozzle structure.
Figure 12B:
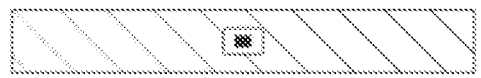
Figure 13A:
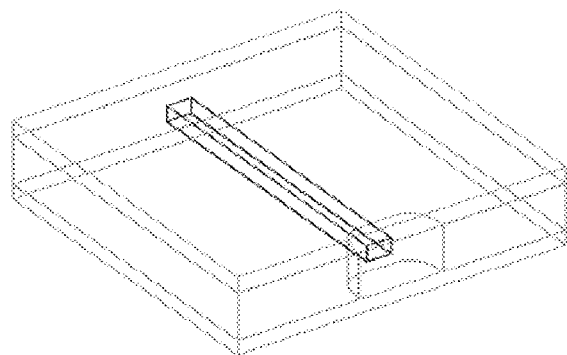
FIGS. 13A and 13B show further possible nozzle structures which can be employed with the invention.
Figure 13B:
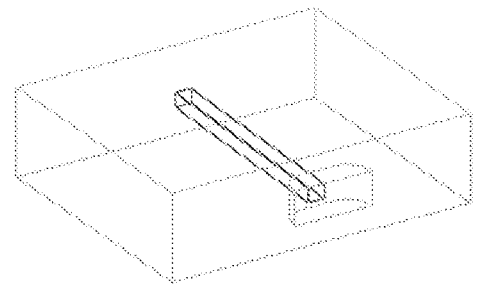
Figure 14A:
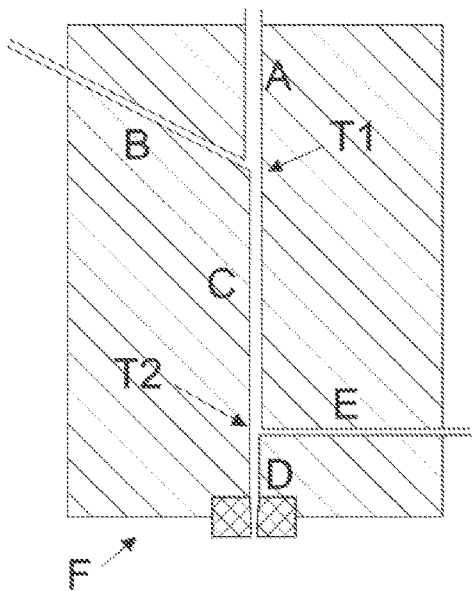
FIGS. 14A and 14B are schematic side views of further nozzle configuration that can be employed with the system of the present invention.
Figure 14B:
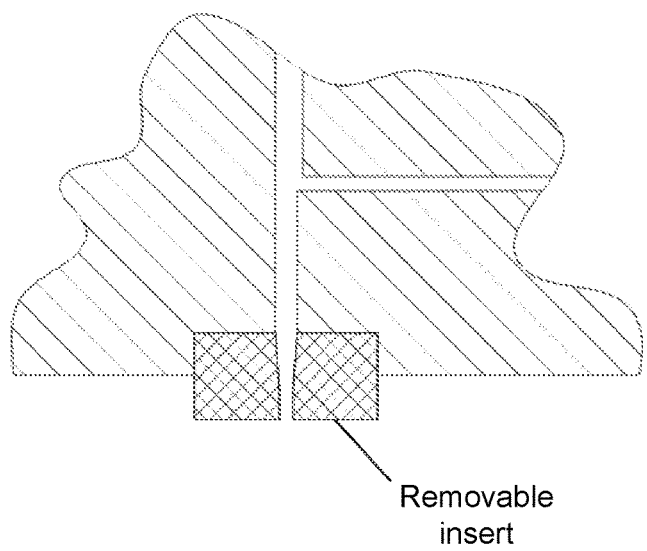

It will be appreciated that, dependant on the fluid characteristics within the system, and also the requirements of the system to provide an ejected sample of a particular type there may be a need to provide a nozzle or some form of other aperture at the outlet F of the system of the invention. FIG. 11 shows a straightforward example of the system in which the outlet F has a nozzle and simply has a cross-section as its outlet which is the same as channel D. FIGS. 12A and 12B show an alternative in which there is an enlarged nozzle of an expanding aperture but same cross-sectional shape as channel D at the outlet F. FIGS. 13A and 13B show how such a nozzle can be constructed, either as part of a laminate construction or as part as a machined construction. FIGS. 14A and 14B show an alternative in which a tapered nozzle is provided at the outlet F. It will be appreciated that the tapered nozzle can be provided as an insert, which means it can be replaced easily and also that alternative nozzle shapes can be provided for different fluid flow characteristics, different applications and also different outlet requirements for the sample.

As mentioned above a number of different drive fluids may be employed with the invention. The pressurised drive fluid can be either miscible with the process fluid, or immiscible with the process fluid. The drive fluid can be compressible or incompressible.

Examples of immiscible fluids are air or oil when the process fluid is water-based, or water when the process fluid is oil-based.

When the drive fluid is immiscible the central channel can be used as a metering volume since it can be ejected in its entirely. However, if it also compressible, for example a gas, the ejection behaviour is more difficult control because gas is compressed during the ejection, and experiences a rapid decompression as the last of the ejected fluid leaves the nozzle. The result of this is a possible defragmentation of the droplet.

Figure 15:
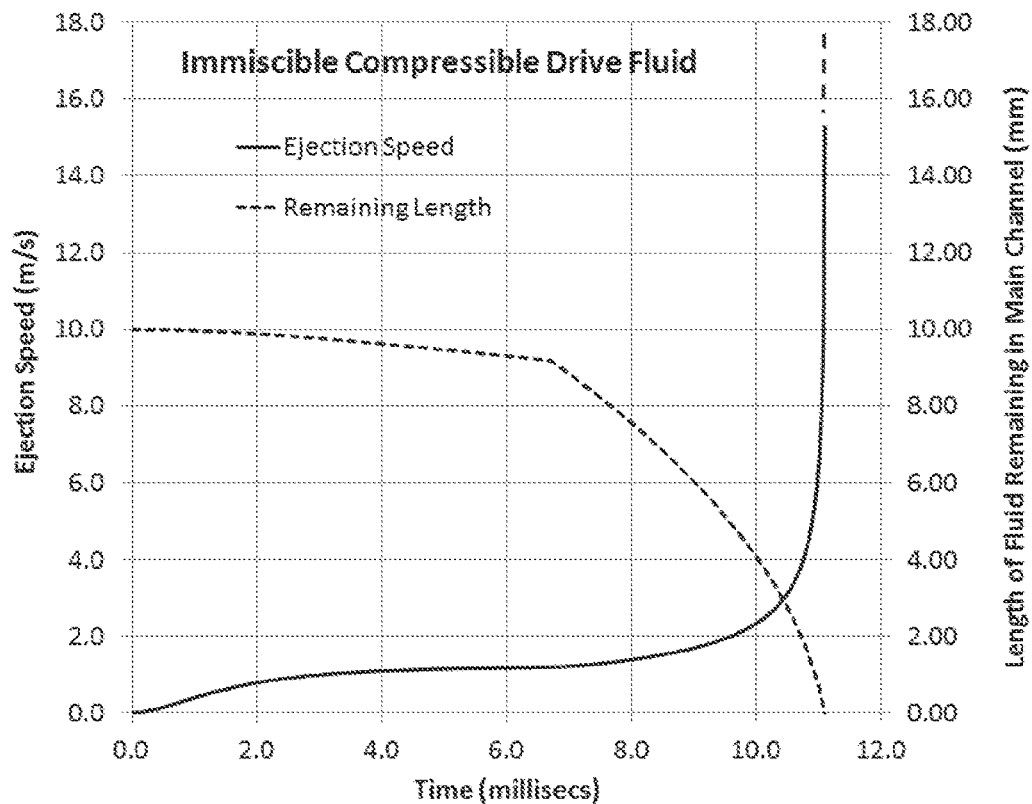
FIGS. 15 and 16 show graphs of the operating characteristics of example systems according to the present invention when employing different drive fluids.
Figure 16:
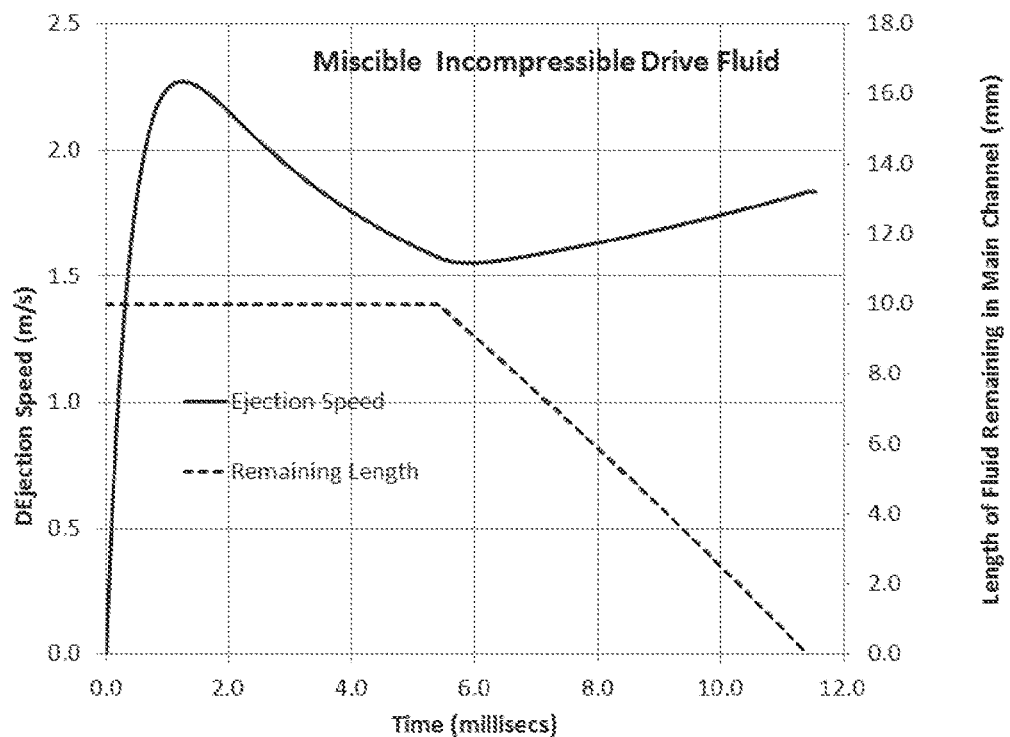

If the fluid is miscible and incompressible, for example an oil-and-oil sytem, the ejection is much smoother, but the metering function now relies only on the valve timing and is not so precise. FIGS. 15 and 16 show some of the performance characteristics for immiscible compressible and miscible incompressible drive fluids respectively. From this it will be appreciated that the appropriate drive fluid for the application in which the invention is employed can be chosen quite easily and that the invention provides flexibility in this regard.

Figure 17A:
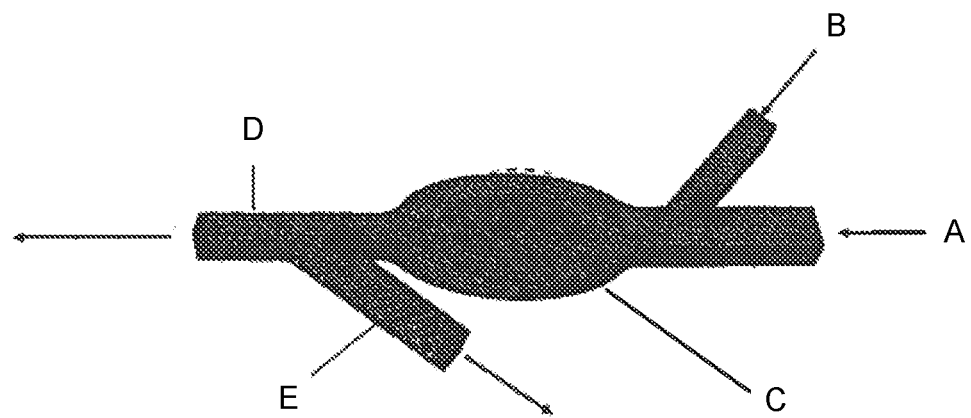
FIGS. 17A and 17B are schematic drawings showing alternative example systems according to the invention with additional features for enabling monitoring of the contents of a channel in the system.
Figure 17B:
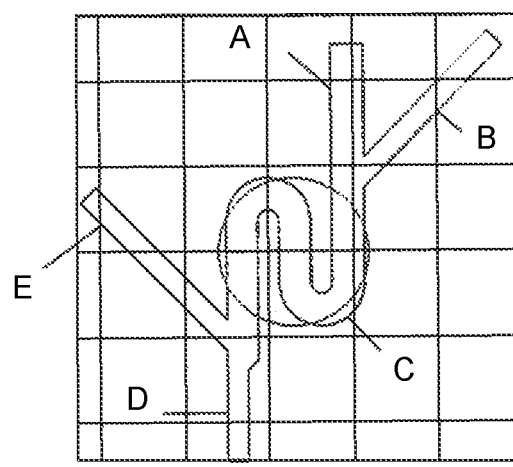

FIGS. 17A and B show examples of a system according to the invention which correspond to those of earlier figures, but which have adaptations to the channel C employed in those earlier examples. In the adaptation of FIG. 17A the channel C has a region of increased cross-sectional area, and in the example of FIG. 17B the channel C has a length which has a folded path. In both these examples the purpose of the additional feature in the channel C is to slow the flow through the channel C. This is to the advantage that, if an optical sensing device, such as a camera, is positioned over the channel C the reduced speed of flow ensures capture of the content of the fluid in the channel C in a more reliable manner. As can be seen from the example of 17B, by the circle presented in the figure, by providing an appropriate structure for the channel C it is possible to ensure that a significant part of the flow in that channel is within the optical device viewing region (indicated by the circle) while fluid passes therethrough, improving image capture through an increased time region image capture can occur.

With all of the above examples ejection can be triggered by one of a number of possible circumstances. For example, ejection can be performed either on a regular or irregular timed basis by appropriate control of the system and reference timing circuitry. It could also be performed following notification of an external event occurring through a related control system, such as detection of a receiving component adjacent to the exit orifice F. In some types of use, such as in bioprocessing where cells are present in the fluid, ejection could be triggered by detection of the existence of one or more cells in the fluid in the channel C, which triggers the ejection process to eject the cells through the orifice F. If such a detector is provided then a number of possible detection systems could be employed, such as a camera system with associated image processing, or some form of light based detection employing transmissive, reflective, scatter detection or a combination thereof. Other alternatives include a capacitive detector or employment of a detector using the Coulter principle. If any such detection approach is provided then there may be a delay between detection of the components to be ejected and triggering of ejection to ensure optimum ejection of the detected component.

As will be appreciated, the present invention provides a very simple and effective system for obtaining samples which can be extremely small in volume in an automated and reliable fashion without significant effect on the continuous flow system from which the sample is being obtained. The sample can be obtained by initiation of the system through detection of components in the flow, or can be controlled on a timed, intermittent, or on demand basis. As will also be appreciated, the system of the present invention can be employed to print droplets from the continuous flow to provide a printing operation if an array of sampling systems is produced.

The invention claimed is:
1. A sample ejection system for ejecting a sample from a flow of fluid, the system comprising:
    a controller; and
    a device having at least one channel comprising:
        a fluid flow channel for receiving at least one flow of fluid;
        a first inlet channel coupled to the fluid flow channel for providing a continuous flow of a process fluid to the fluid flow channel;
        a suction channel coupled to the fluid flow channel at a first location located downstream from the first inlet channel for ejecting the process fluid,
        wherein the first inlet channel comprises a valve controlled by the controller for selectively opening and closing the valve to stop providing process fluid to the fluid flow channel and wherein the suction channel comprises a valve controlled by the controller for selectively opening and closing the valve to stop the ejection of process fluid from the fluid flow channel;
        an external vacuum system operatively coupled to the suction channel providing suction for aiding in ejecting the process fluid from the fluid flow channel;
        a second inlet channel coupled to the fluid flow channel for selectively providing a pressurized fluid to the fluid flow channel,
        wherein the second inlet channel comprises a valve controlled by the controller for selectively opening and closing the valve to introduce pressurized fluid to the fluid flow channel,
        a pressurized fluid supply connected to the second inlet channel for providing the pressurized fluid to the fluid flow channel,
        wherein, in response to introduction of pressurized fluid to the fluid flow channel, the fluid flow channel comprises both process fluid and pressurized fluid; and
        an exit channel coupled to the fluid flow channel at a second location located downstream from the first inlet channel and the second inlet channel for ejecting the process fluid and the pressurized fluid,
        wherein increased pressure in the fluid flow channel through introduction of the pressurized fluid causes both the process fluid and the pressurized fluid to enter the exit channel from the fluid flow channel and exit the device via the exit channel,
        wherein entry of the pressurized fluid into the suction channel is prevented at least in part by at least one of (i) configuring the suction channel to have a length greater than a length of the exit channel; or (ii) configuring the suction channel to have a cross-sectional dimension smaller than a cross-sectional dimension of the exit channel.

2. A sample ejection system according to claim 1, wherein the pressurized fluid supplied by the pressurized fluid supply is compressible.

3. A sample ejection system according to claim 2, wherein the pressurized fluid supplied by the pressurized fluid supply is immiscible with the process fluid.

4. A sample ejection system according to claim 1, further comprising a nozzle provided at an exit orifice of the exit channel.

5. A sample ejection system according to claim 4, wherein the nozzle is a removable insert.

6. A sample ejection system according to claim 2, wherein the nozzle tapers inwardly in a direction corresponding to a flow direction of the process fluid and the pressurized fluid.

7. A sample ejection system according to claim 1 wherein a portion of the fluid flow channel located upstream of the first inlet channel provides a flow restriction.

8. A sample ejection system according to claim 1, wherein a portion of the fluid flow channel located downstream of the suction channel provides a flow restriction.

9. A sample ejection system according to claim 1, wherein a detector is provided in the fluid flow channel upstream of the first inlet channel for detecting a component in a flow of process fluid and provide a trigger signal to the controller to trigger supply of a pressurized fluid.

10. A sample ejection system according to claim 1, wherein the fluid flow channel comprises a region of increased cross-sectional area to reduce a flow rate therethrough.

11. A sample ejection system according to claim 1, wherein the fluid flow channel has a folded flow path to reduce a flow rate therethrough.

12. A sample ejection system for ejecting a sample from a flow of fluid, the system comprising:

a controller; and a device having at least one channel comprising:

a fluid flow channel for receiving at least one flow of fluid;

a first inlet channel coupled to the fluid flow channel for providing a continuous flow of a process fluid to the fluid flow channel;

a suction channel coupled to the fluid flow channel at a first location located downstream from the first inlet channel for ejecting the process fluid, wherein the first inlet channel comprises a valve controlled by the controller for selectively opening and closing the valve to stop providing process fluid to the fluid flow channel and wherein the suction channel comprises a valve controlled by the controller for selectively opening and closing the valve to stop the ejection of process fluid from the fluid flow channel;

an external vacuum system operatively coupled to the suction channel providing suction for aiding in ejecting the process fluid from the fluid flow channel;

a second inlet channel coupled to the fluid flow channel for selectively providing a pressurized fluid to the fluid flow channel for increasing pressure in the fluid flow channel, wherein the second inlet channel comprises a valve controlled by the controller for selectively opening and closing the valve for approximately 1 millisecond to approximately 10 milliseconds to introduce pressurized fluid to the fluid flow channel, a pressurized fluid supply connected to the second inlet channel for providing the pressurized fluid to the fluid flow channel, wherein selectively opening and closing the valve for approximately 1 millisecond to approximately 10 milliseconds prevents, at least in part, disruption of the continuous flow of the process fluid, wherein, in response to introduction of pressurized fluid to the fluid flow channel, the fluid flow channel comprises both process fluid and pressurized fluid; and an exit channel coupled to the fluid flow channel at a second location located downstream from the first inlet channel and the second inlet channel for ejecting the process fluid and the pressurized fluid, wherein increased pressure in the fluid flow channel through introduction of the pressurized fluid causes both the process fluid and the pressurized fluid to enter the exit channel from the fluid flow channel and exit the device via the exit channel, wherein entry of the pressurized fluid into the suction channel is prevented at least in part by at least one of (i) configuring the suction channel to have a length greater than a length of the exit channel; or (ii) configuring the suction channel to have a cross-sectional dimension smaller than a cross-sectional dimension of the exit channel, wherein pressure in the fluid flow channel reduces in response to ejection of the process fluid and the pressurized fluid.

13. The sample ejection system of claim 12, wherein the pressurized fluid is provided to the fluid flow channel at a pre-determined time basis.

14. The sample ejection system of claim 12, wherein the pressurized fluid is provided to the fluid flow channel in response to a detection of an existence of one or more cells in the fluid flow channel.

15. The sample ejection system of claim 12, wherein the pressurized fluid is provided to the fluid flow channel in response to a manually provided input.

16. The sample ejection system of claim 12, wherein the external vacuum system coupled to the suction channel provides a fixed suction pressure.

\* \* \* \* \*